US006243643B1

(12) United States Patent
Uematsu

(10) Patent No.: US 6,243,643 B1
(45) Date of Patent: Jun. 5, 2001

(54) VEHICLE CONTROL APPARATUS FOR CALCULATING CONTROL VALUE WITH BASIC VALUE AND CORRECTION VALUE

(75) Inventor: Yoshitaka Uematsu, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/372,751

(22) Filed: Aug. 11, 1999

(30) Foreign Application Priority Data

Sep. 29, 1998 (JP) ........................................ 10-274884

(51) Int. Cl.[7] .............................................. G06F 19/00
(52) U.S. Cl. .................................... 701/115; 701/103
(58) Field of Search ............................ 701/101, 102, 701/103, 104, 105, 115

(56) References Cited

U.S. PATENT DOCUMENTS 4,932,376 * 6/1990 Linder et al. ........................ 701/115
5,050,562 * 9/1991 Ishii et al. ........................... 701/103
5,091,858 * 2/1992 Paielli ................................. 701/115
5,200,900 * 4/1993 Adrain et al. ........................ 701/115
5,523,948 * 6/1996 Adrain ................................ 701/115
5,826,211 * 10/1998 Kobayashi .......................... 701/115
5,951,619 * 9/1999 Merl et al. .......................... 701/115

* cited by examiner

*Primary Examiner*—Willis R. Wolfe
(74) *Attorney, Agent, or Firm*—Nixon & Vanderhye

(57) ABSTRACT

A control apparatus for vehicles has a memory, which includes a plurality of correction information tables and a designation information table. The correction information tables stores a plurality of address data indicating types of correction calculations, and a plurality of correction terms to be calculated based on operating conditions in dependence on the types of correction calculations. The designation information table is for designates sequentially the plurality of correction information tables based on the types of correction calculations. A processing unit calculates sequentially a plurality of control values based on the address data and the correction terms with reference to the correction information tables designated by the designation information table, and calculating a final control value from the sequentially calculated control values.

15 Claims, 11 Drawing Sheets

| k | INFORMATION TABLE NUMBER n |
|---|---|
| 0 | HEAD ADDRESS OF INFORMATION TABLE 1(1000h) |
| 1 | HEAD ADDRESS OF INFORMATION TABLE 2(1100h) |
| 2 | HEAD ADDRESS OF INFORMATION TABLE 3(1200h) |
| 3 | HEAD ADDRESS OF INFORMATION TABLE 4(1300h) |

FIG. 8A

INFORMATION TABLE 1

| Address / INDEX | Content | |
|---|---|---|
| 1000h | HEAD ADDRESS OF INITIALIZATION ROUTINE | (A) |
| | HEAD ADDRESS OF ADDITION ROUTINE | (B) |
| | NUMBER OF CORRECTION TERMS (INDEX) | (C) |
| 0 | FTHW STORAGE ADDRESS | |
| 1 | FASE STORAGE ADDRESS | |
| 2 | FKL STORAGE ADDRESS | |

FIG. 8B

INFORMATION TABLE 2

| Address / INDEX | Content |
|---|---|
| 1100h | HEAD ADDRESS OF INITIALIZATION ROUTINE |
| | HEAD ADDRESS OF MAXIMUM VALUE |
| | NUMBER OF CORRECTION TERMS (INDEX) |
| 0 | OT STORAGE ADDRESS |
| 1 | FTHR STORAGE ADDRESS |

FIG. 8C

INFORMATION TABLE 3

| Address / INDEX | Content |
|---|---|
| 1200h | HEAD ADDRESS OF INITIALIZATION ROUTINE |
| | HEAD ADDRESS OF MULTIPLICATION ROUTINE |
| | NUMBER OF CORRECTION TERMS (INDEX) |
| 0 | TP STORAGE ADDRESS |
| 1 | IDL STORAGE ADDRESS |
| 2 | AF STORAGE ADDRESS |

FIG. 8D

INFORMATION TABLE 4

| Address / INDEX | Content |
|---|---|
| 1300h | HEAD ADDRESS OF INITIALIZATION ROUTINE |
| | HEAD ADDRESS OF ADDITION ROUTINE |
| | NUMBER OF CORRECTION TERMS (INDEX) |
| 0 | FMW STORAGE ADDRESS |
| 1 | ADJ STORAGE ADDRESS |

VEHICLE CONTROL APPARATUS FOR CALCULATING CONTROL VALUE WITH BASIC VALUE AND CORRECTION VALUE

CROSS REFERENCE TO RELATED APPLICATION

This application relates to and incorporates herein by reference Japanese Patent application No. 10-274884 filed on Sep. 29, 1998.

BACKGROUND OF THE INVENTION

1. Field of the Invention

The present invention relates to a vehicle control apparatus, and more particularly to a control apparatus which calculates a final vehicle control value based on a basic value and a correction value varying with operating conditions of a vehicle.

2. Description of Related Art

An internal combustion engine for vehicles, for instance, is controlled by an electronically-controlled fuel injection apparatus. This apparatus calculates a basic fuel injection value (fuel injection duration) Tp based on the detection values of an engine rotation speed and an intake air pressure (intake air quantity), and various correction values based on engine operating conditions and various mechanical characteristics of the engine. The apparatus calculates a final injection value (duration) TAU based on the calculated basic value and correction values to drive fuel injectors for the final value TAU for fuel injection.

More specifically, the apparatus executes various calculations in the order shown in FIG. 17 to calculate the final injection value TAU from the basic value TP and the following exemplary correction values.

FTHW: warm-up fuel enrichment correction for increasing fuel for engine warm-up in accordance with engine coolant temperature;

FASE: after-start fuel enrichment correction for increasing fuel after engine starting;

FKL: small air enrichment correction for increasing fuel in case of small intake air quantity;

RICHX: enrichment correction for increasing fuel in accordance with a maximum of radiator temperature RAD, catalyst over-temperature OT and the like;

IDL: idling correction for increasing and decreasing fuel to prevent engine stall at the time of engine idling;

AF: air-fuel ratio correction for increasing and decreasing fuel to maintain the air-fuel ratio of air-fuel mixture;

FMW: wall-sticking fuel correction to increase fuel amount in correspondence with sticking of injected fuel around an engine intake valve; and ADJ: adjustment correction for increasing and decreasing fuel from an external side.

The above calculation processing must be changed from engine to engine and vehicle to vehicle, because the characteristics of engines and vehicles are different from each other. For instance, additional correction values may have to be calculated in some types of engines, and some of the above correction values may have to be omitted in other types of engines.

It is thus required to check a control program of the control apparatus and modify the same, each time the type or specification of the engine or vehicle is changed. This program check and modification requires an enormous program development or modification workload, because it is very difficult to find out the sections in the program to be modified. Thus, it is almost impossible to use the program for one apparatus to another apparatus.

SUMMARY OF THE INVENTION

It is therefore an object of the present invention to provide a control apparatus for vehicles, which is capable of being used for different types of vehicles with only a modification to a program section related to corrections values.

According to the present invention, a control apparatus has a designation information table and a correction information table. The correction information table stores address data of calculation routines of different types and address data in which correction terms are stored. A processing unit calls functions designated in the information tables to calculate a control value in its control value calculation processing. In the event that the control specifications are required to be changed, only a part of the correction information table is modified, thus enabling the reuse of a control program of the processing unit.

BRIEF DESCRIPTION OF THE DRAWINGS

The above and other objects, features and advantages of the present invention will become more apparent from the following detailed description made with reference to the accompanying drawings. In the drawings:

FIG. 8A to 8D are schematic diagrams showing formats of the correction information tables used in the embodiment;

DETAILED DESCRIPTION OF THE PREFERRED EMBODIMENT

The present invention will be described hereunder with reference to an embodiment, which is directed to an electronic control apparatus for controlling fuel injection operations of a multi-cylinder spark-ignited internal combustion engine.

Figure 1:
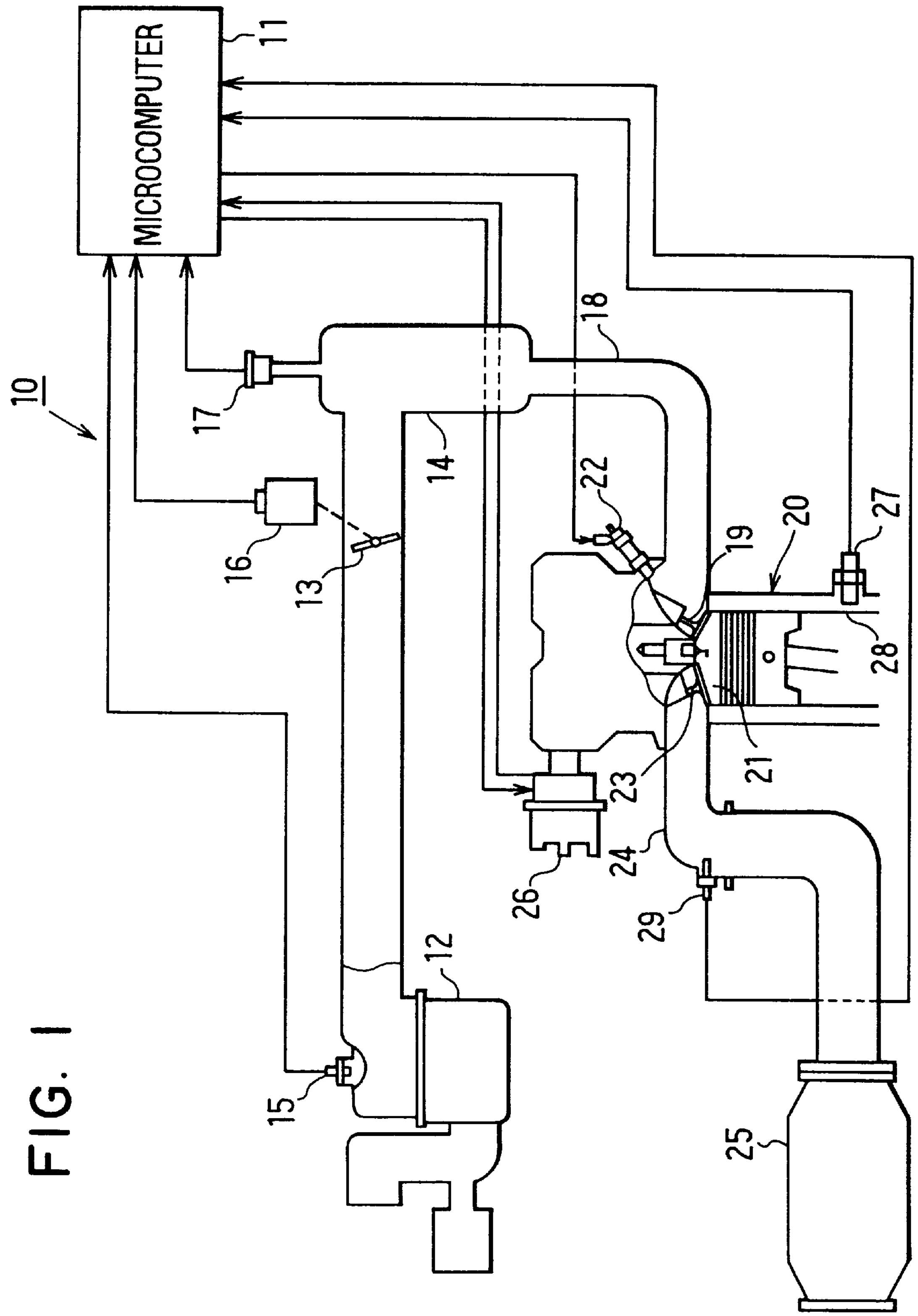
FIG. 1 is a schematic view showing an engine control system to which a control apparatus according to an embodiment of the present invention is applied.

Referring first to FIG. 1, an engine control system 10 has an internal combustion engine 20. The engine 20 has at its intake side an air cleaner 12, an accelerator-linked throttle valve 13 and a surge tank 14. The engine 20 also has at its exhaust side an exhaust valve 23, an exhaust manifold 24 and a catalytic converter 25. An intake air temperature sensor 15 is mounted in the air cleaner 12, and a throttle position sensor 16 is coupled with the throttle valve 13. A vacuum sensor 17 is mounted on the surge tank 14.

The surge tank 14 is in communication with combustion chambers 21 of the engine 20 through intake manifolds 18 and intake valves 19, respectively. Fuel injectors 22 are mounted in the intake manifolds 18, so that each fuel injector 22 injects pressurized fuel for each cylinder.

A rotation position sensor 26 is provided in an ignition distributor. An engine coolant temperature sensor 27 is mounted on an engine block 28, and an oxygen ($O_2$) concentration sensor 29 is mounted upstream the catalytic converter 29.

Those sensors are connected to a microcomputer 11, which calculates fuel injection duration in response to the detected engine operating conditions and drives the fuel injectors 22. The microcomputer 11 also controls ignitions of the engine 20.

Figure 2:
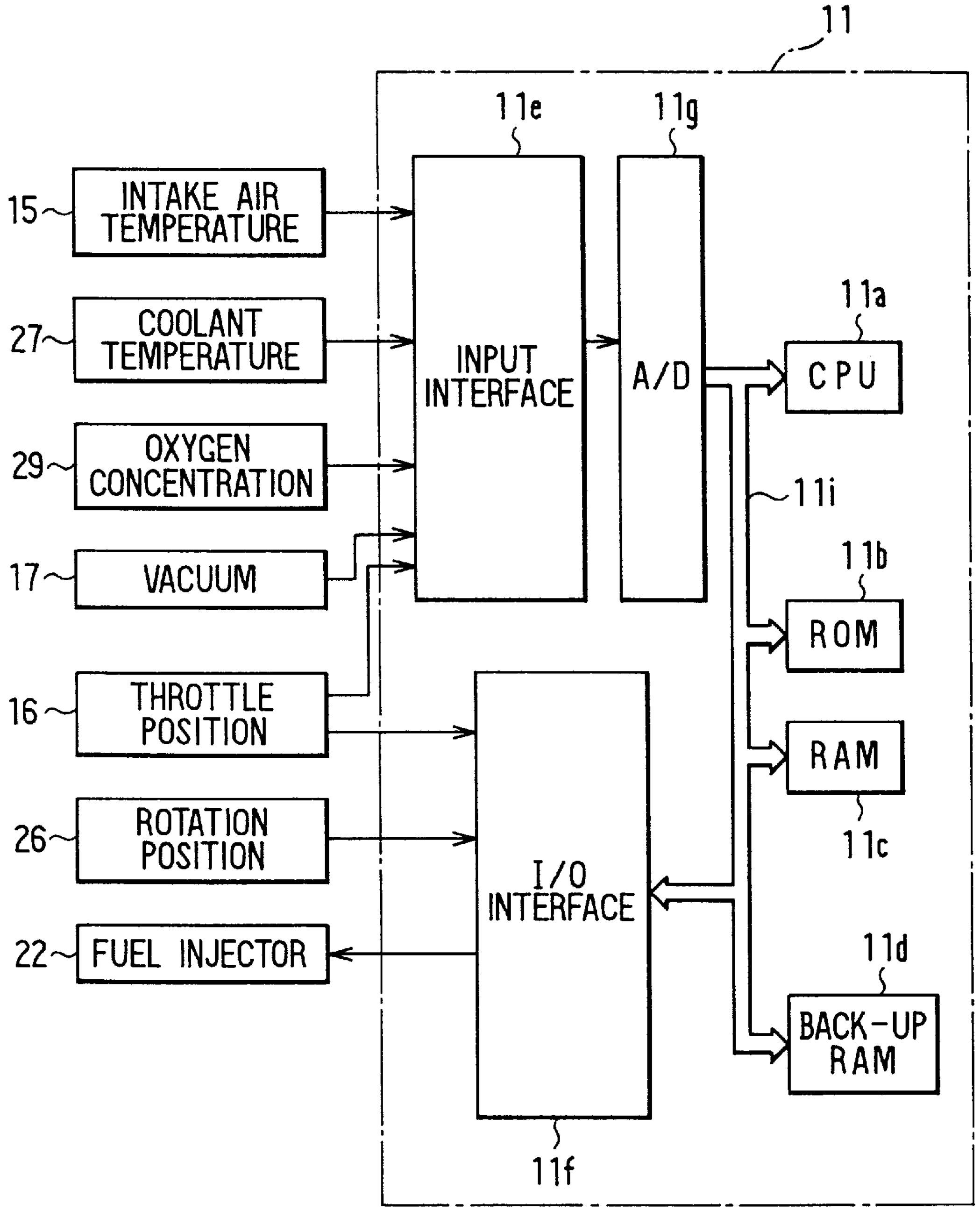
FIG. 2 is a block diagram showing the control apparatus shown in FIG. 1.

As shown in detail in FIG. 2, the microcomputer 11 comprises a central processing unit (CPU) 11*a*, a read only memory (ROM) 11*b* storing processing programs, a random access memory (RAM) 11*c* for storing temporary data, a backup RAM 11*d* for storing data even during an engine rest, an input interface circuit 11*e*, an analog/digital (A/D) converter 11*g* with a built-in multiplexer, and an input/output (I/O) interface circuit 11*f*. Those units are connected through a bus 11*i*.

The analog/digital converter 11*g* receives sequentially an intake air temperature signal, a throttle position signal, an intake air pressure (PM) signal, a water coolant temperature signal and an oxygen concentration signal of the sensors 15, 16, 17, 27 and 29 in a time-divided multiplexing method, and sequentially converts analog values of those signals into corresponding digital values to be transmitted through the bus 11*i*.

The input/output interface circuit 11*f* receives a throttle position pulse signal and a rotation pulse signal (NE) of the sensors 16 and 26 and transmit those to the CPU 11*a* through the bus 11*i*. The interface circuit 11*f* also applies a fuel injection signal produced from the CPU 11*a* to the fuel injector 22, so that the fuel injector 22 injects fuel for a duration (TAU) of the fuel injection signal.

The CPU 11*a* operates to execute control programs stored in the ROM 11*b* as shown in the following flow diagrams.

Figure 3:
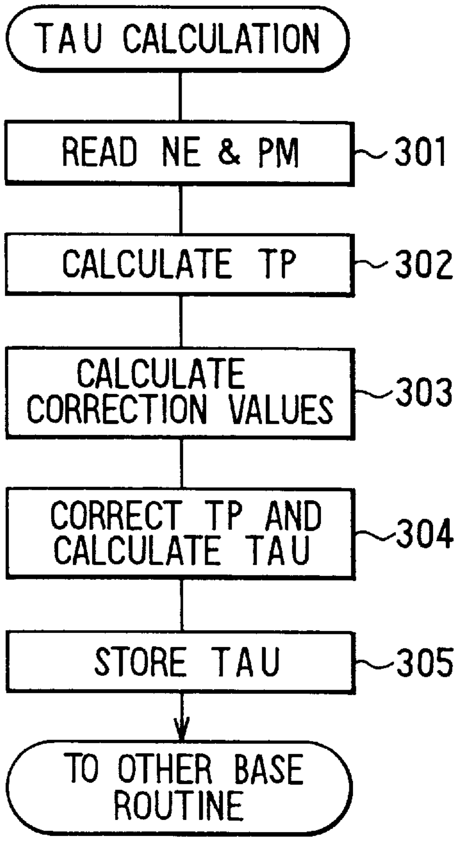
FIG. 3 is a flow diagram showing a fuel injection duration (TAU) calculation routine executed in the embodiment.

As shown in FIG. 3, a fuel injection quantity, which is defined as a fuel injection duration (TAU), is calculated in a fuel injection duration calculation routine as a base routine. In this routine, the CPU 11*a* reads in the digital values of intake air pressure PM and engine rotation speed NE at step 301, calculates a basic fuel injection duration TP as PM/NE at step 302, and stores the calculated duration TP in a specified address in the RAM 11*c* at step 303.

Then, the CPU 11*a* calculates various correction values for an engine warm-up enrichment, an air-fuel ratio feedback and the like at step 303, and stores the same in specified addresses in the RAM 11*c*. The CPU 11*a* corrects the calculates a final fuel injection duration TAU by correcting the calculated basic duration TP with the calculated correction values at step 304, and stores the same in a specified address in the RAM 11*c* at step 305. The CPU 11*a* then proceeds to another base routine.

Figure 4:
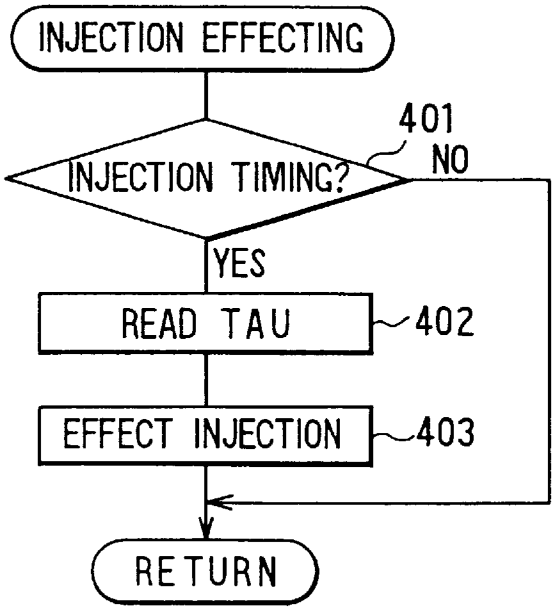
FIG. 4 is a flow diagram showing a fuel injection effecting routine executed in the embodiment.

The CPU 11*a* executes a fuel injection effecting routine shown in FIG. 4 at every specified engine rotation position (angle). Specifically, the CPU 11*a* checks at step 401 whether it is an injection timing. If it is the injection timing (YES), the CPU 11*a* reads in at step 402 the injection duration TAU calculated in the TAU calculation routine (FIG. 3), and produces at step 403 a drive pulse having a time period of TAU to effect fuel injection from the injector 22.

The correction value calculation at step 303 (FIG. 3) is described in further detail with reference to FIGS. 5 to 16.

Figures 5, 6:
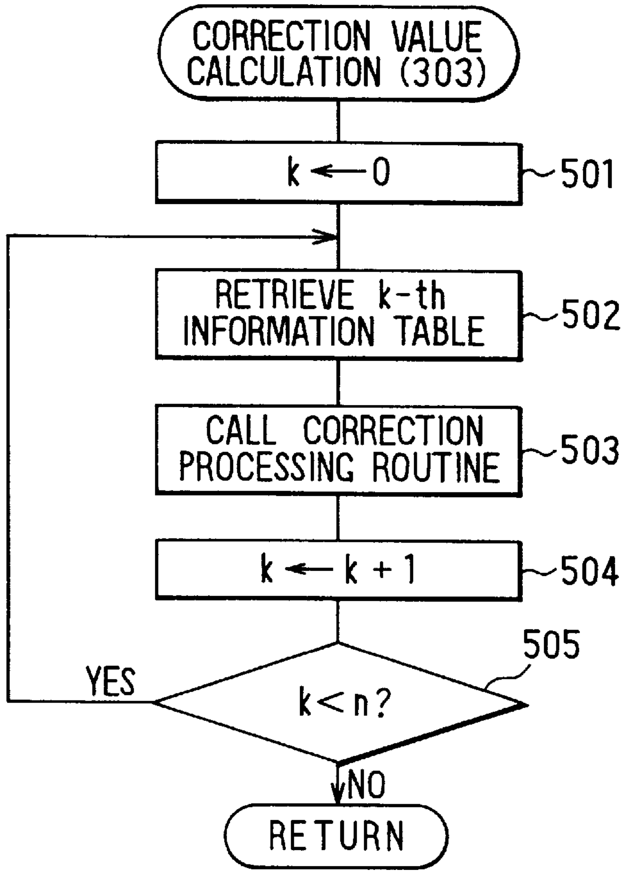
FIG. 5 is a flow diagram showing a routine for selecting designation information tables.
FIG. 6 is a schematic view showing a format of the designation information tables used in the embodiment.

Referring to FIG. 5, the CPU 11*a* resets at step 501 a variable k, which designates an address of an information table to be retrieved for information referencing. The information table is shown in FIG. 6. The CPU 11*a* then retrieves at step 502 the address data of the information table 1 to be referred to in correspondence with the variable k. For instance, if k=0 (area 0), an address data 1000*h* is read out to refer to the information table 1, and an information table 1 shown in FIG. 8A is selected. The CPU 11*a* calls at step 503 a correction processing routine shown in FIG. 7, so that the processing in the information table of FIG. 8A is executed.

The CPU 11*a* increments the variable k at step 504 to designate the information table number to be referred to next time. Thus, the address data of the information tables are read out in the order of the 1100*h*, 1200*h* and 1300*h*, so that the information tables are sequentially read out from the table 1 to table 4 to execute the processing defined in the information tables 1 to 4 in the routine of FIG. 7.

The CPU 11*a* then compares the variable k with the maximum number n (n=4) of the information tables at step 505 to check if all the information tables 1 to 4 have been referred to. If k<n (YES), the CPU 11*a* repeats steps 502 to 504. If not (NO), the CPU 11*a* returns to step 304 in FIG. 3, thus completing the routine of FIG. 5.

Figure 7:
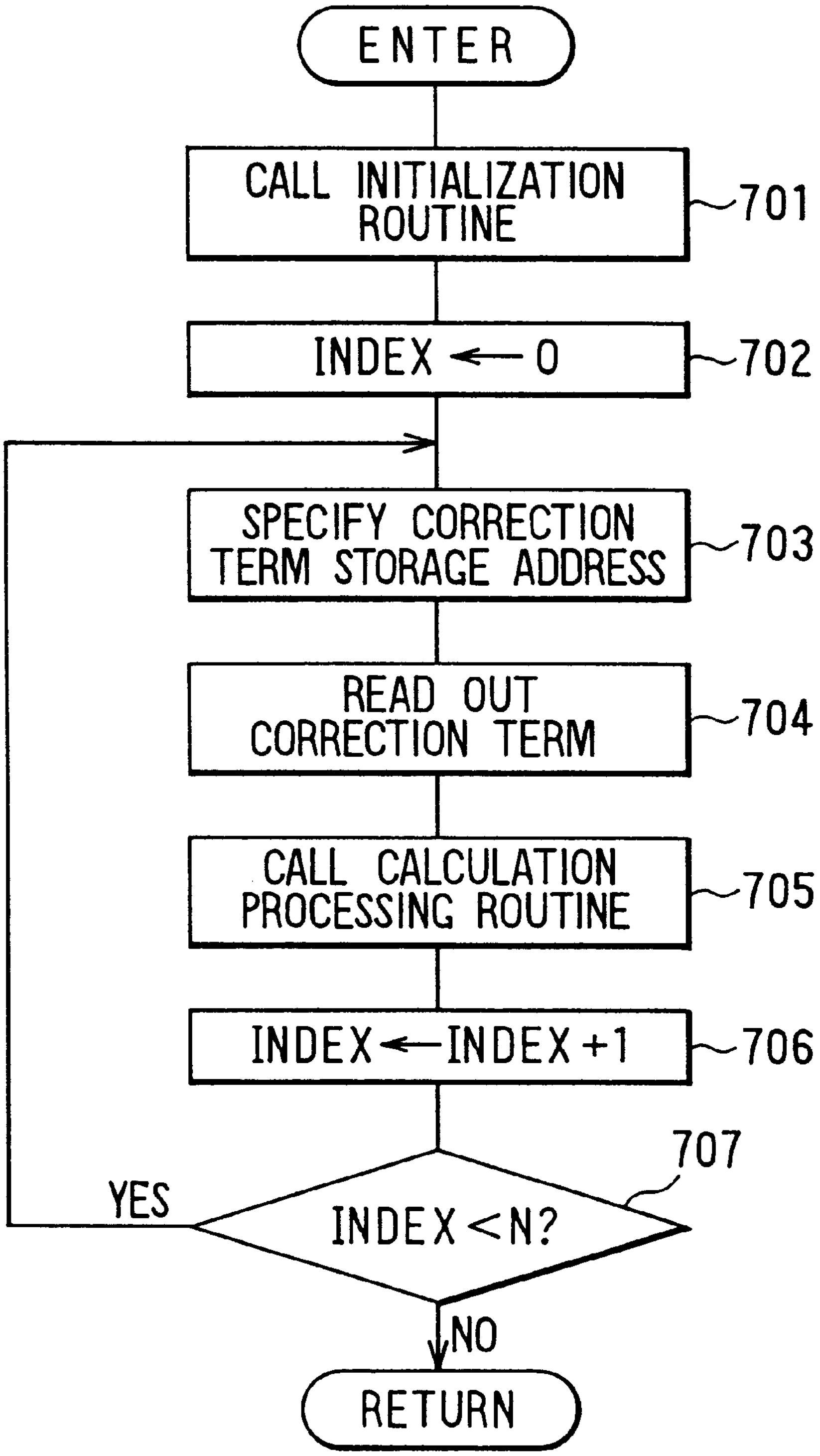
FIG. 7 is a flow diagram showing a correction processing routine executed in the embodiment.
Figure 9:
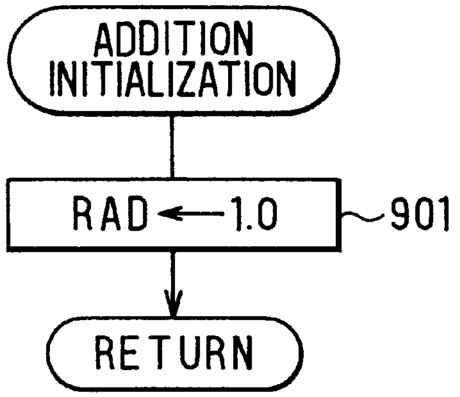
FIG. 9 is a flow diagram showing an addition initialization routine executed in the embodiment.

In the routine shown in FIG. 7, the CPU 11*a* calls at step 701 an initialization (initial setting routine) based on the data defined in the head address of the information table retrieved at step 502 (FIG. 5). More specifically, an addition initialization routine is called first based on a head address data (A) of the initialization routine defined in the information table 1 corresponding to the address 1000*h* designated at a timing of resetting the variable (k=0). In the addition initialization routine, as shown in FIG. 9, an initial value 1.0 is set as a correction term RAD at step 901.

The CPU 11*a* then resets at step 702 an index INDEX, which is for designating sequentially the correction terms of the information table, and specifies at step 703 the address, in which the correction term to be used in the correction calculation is stored, by searching for the information table 1 from the INDEX value (0, 1, 2 and the like). At step 704, the CPU 11*a* reads out data of the correction term from the address specified at step 703. For instance, if INDEX=0, the address storing a basic warm-up correction value FTHW is searched and specified by the information table 1 ((C) in FIG. 8A), the basic warm-up correction value FTHW is read out from the corresponding address.

Then, the CPU 11*a* calls a calculation processing routine at step 705 based on the data stored in a specified address in the information table, that is, the data stored next to the address data of the initialization routine ((B) in FIG. 8A). Here, if the variable k=0, the addition processing routine is called based on the information tables 1 shown in FIG. 8A to execute the addition routine shown in FIG. 10. In the addition routine, the initial value 1.0 of the correction term RAD and the basic warm-up correction value FTHW are added at step 1001 at first, and then at step 1002 the addition resulting value is returned to the correction routine shown in FIG. 7.

The CPU 11*a* then increments the INDEX at step 706, and compares the INDEX and the number N of the correction terms stored in the information table at step 707 to check whether all the correction terms designated in the information table have been calculated. The processing returns to step 703 because the INDEX is initially less than N (YES). The addition routine shown in FIG. 10 is called again at step 705, so that the addition accumulated value and the correction terms specified newly by the INDEX are added sequentially. By the repetition of the above calculation processing, the calculation of RAD=1.0+FTHW+FASE+FKL is completed. The processing then returns to step 503 (FIG. 5), if it is determined at step 707 that INDEX has reached N.

As described above, the CPU 11*a* increments the variable k at step 504, and compares the variable k with the number of information tables n at step 505 to check whether all the calculations required for the calculation of the fuel injection duration TAU have been completed. The number of information tables n is defined in the table shown in FIG. 6 in advance. Since four information tables are provided in this embodiment (n=4), the value k is incremented to k=1 (area 1) after the processing of the addition routine (k=0). Thus, the next address data 1100*h* is read out to execute the next information table 2.

The CPU 11*a* similarly calls the calculation routine of FIG. 7 again at step 503 and searches the information table in the similar manner. A maximum value initialization routine shown in FIG. 11 is executed this time with reference to the information table 2 shown in FIG. 8B.

Figure 11:
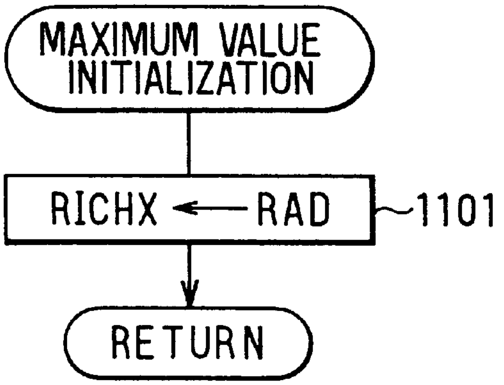
FIG. 11 is a flow diagram showing a maximum value initialization routine executed in the embodiment.
Figure 12:
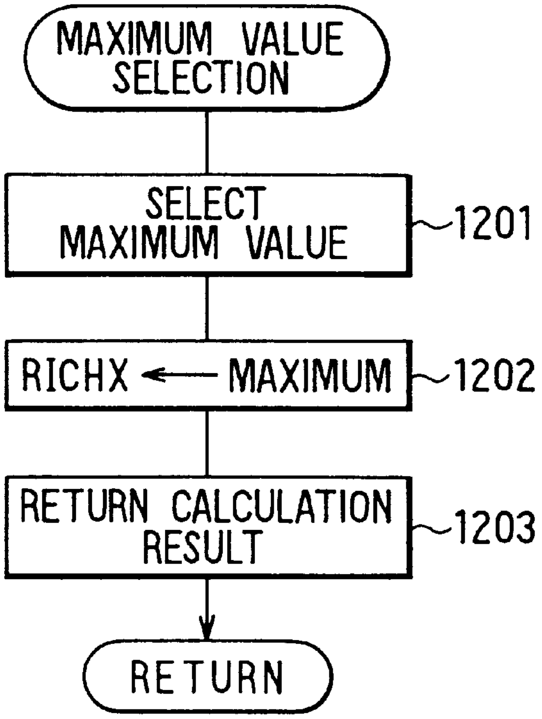
FIG. 12 is a flow diagram showing a maximum value selection processing routine executed in the embodiment.

In FIG. 11, the correction term RAD is copied to a correction term RICHX at step 1101. The CPU 11*a* executes the processing of steps 703 and 704, and calls the calculation routine at step 705 so that a maximum value selection routine is executed as shown in FIG. 12.

In maximum value selection routine (FIG. 12), the CPU 11*a* compares the correction term RICHX with a catalyst over-heating prevention correction value OT at 1201, sets the larger one as the correction term RICHX at step 1202, and the set result is returned to the correction routine (FIG. 7) at step 1201. The CPU 11*a* increments the INDEX, and compares the correction term RICHX with an engine acceleration enrichment correction value FTHR. Thus, a maximum one of the three correction values are calculated finally.

Then the value k is incremented to k=2 (area 2) at step 504 (FIG. 5), so that the next address data 1200*h* is read out to execute the next information table 3.

The CPU 11*a* similarly calls the calculation routine of FIG. 7 again at step 503 and searches the information table in the similar manner. A multiplication initialization routine shown in FIG. 13 is executed this time with reference to the information table 3 shown in FIG. 8C.

Figure 13:
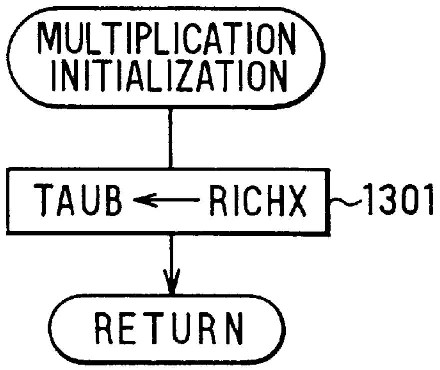
FIG. 13 is a flow diagram showing a multiplication initialization routine executed in the embodiment.
Figure 14:
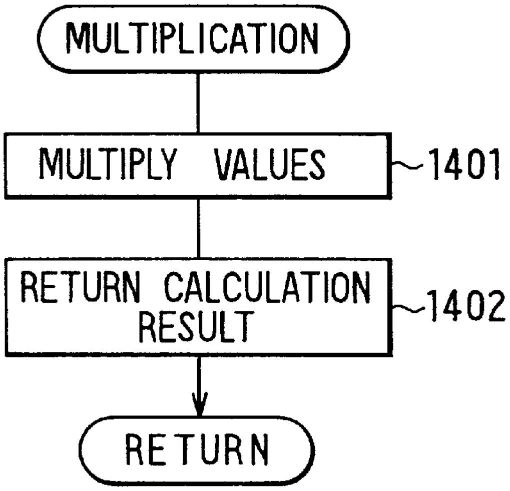
FIG. 14 is a flow diagram showing a multiplication processing routine executed in the embodiment.

In FIG. 13, the CPU 11*a* copies the correction term RICHX to the correction term TAUB at step 1301. The CPU 11*a* executes the processing of steps 703 and 704, and calls the calculation routine at step 705 so that a multiplication routine is executed as shown in FIG. 14. In the multiplication routine, the CPU 11*a* multiplies at step 1401 sequentially the basic injection quantity TP, an engine stall prevention correction value IDL and an air-fuel ratio correction value AF to the correction term TAUB to determine a final correction term TAUB.

Then the value k is incremented to k=3 (area 3) at step 504 (FIG. 5), so that the next address data 1300*h* is read out to execute the next information table 4.

The CPU 11*a* similarly calls the calculation routine of FIG. 7 again at step 503 and searches the information table in the similar manner. An addition initialization routine shown in FIG. 15 is executed this time with reference to the information table 4 shown in FIG. 8D.

Figure 10:
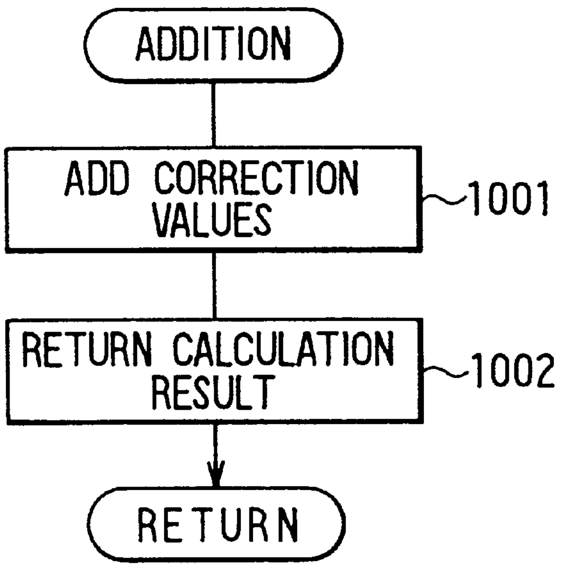
FIG. 10 is a flow diagram showing an addition processing routine executed in the embodiment.
Figure 15:
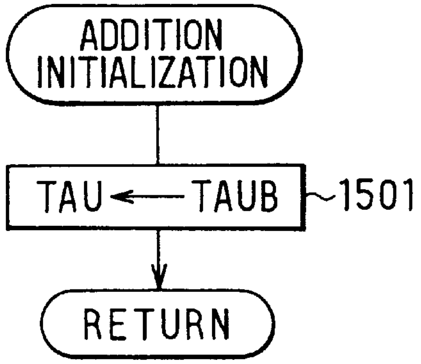
FIG. 15 is a flow diagram showing an addition initialization routine executed in the embodiment.
Figures 16A, 16B, 16C, 16D:
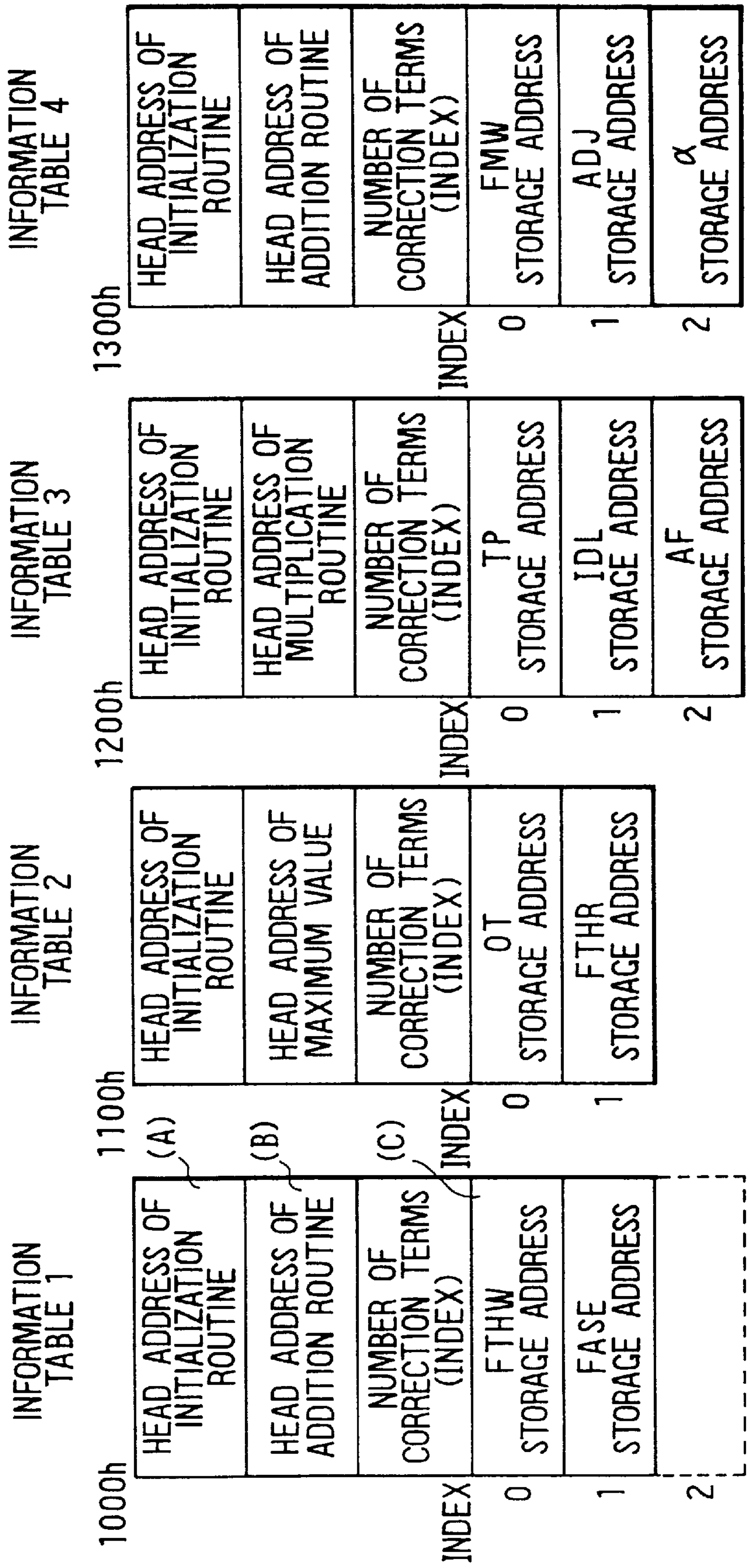
FIGS. 16A to 16D are schematic diagrams showing modified formats of the correction information tables shown in FIG. 8.
Figure 17:
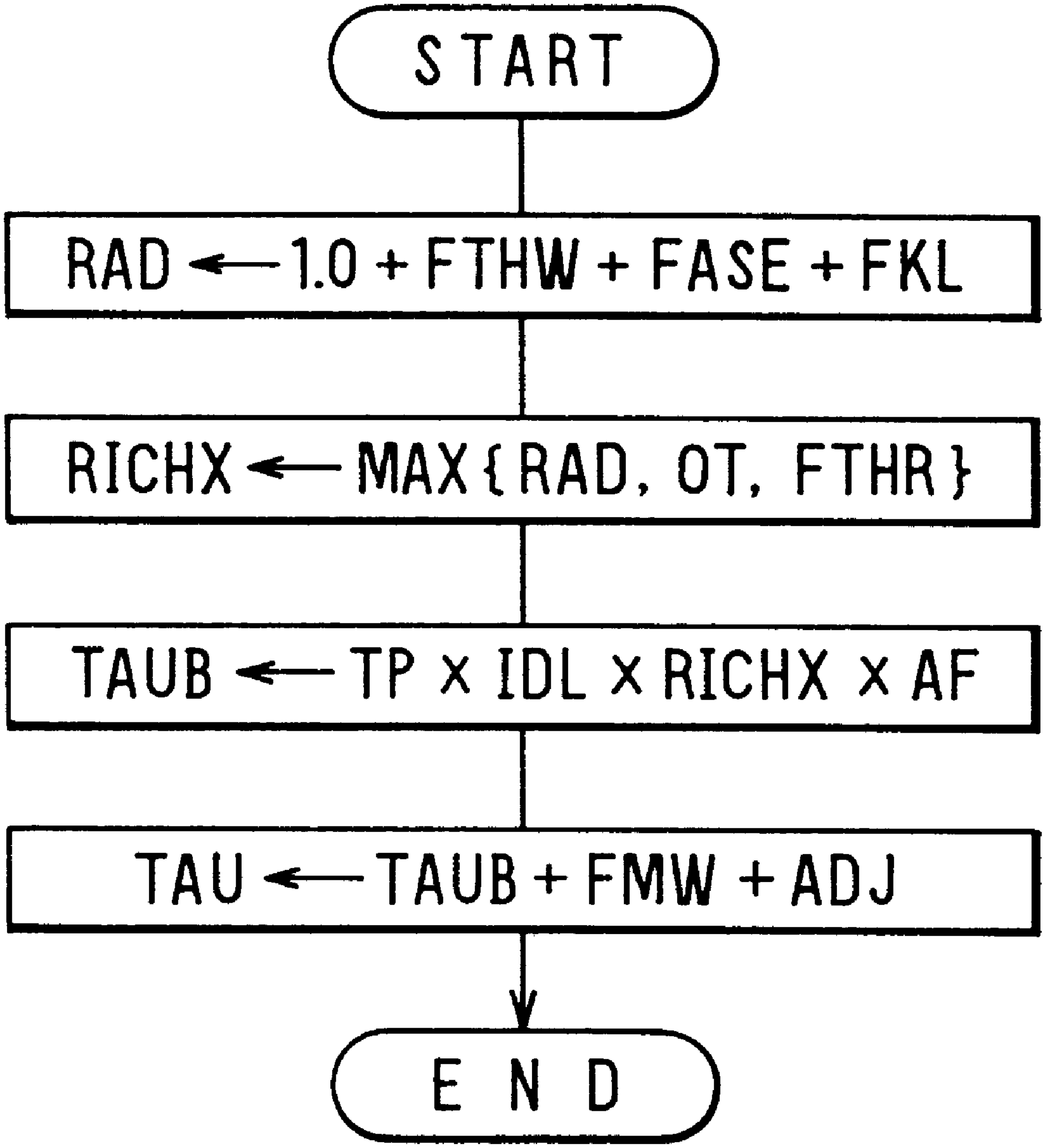
FIG. 17 PRIOR ART
FIG. 17 is a flow diagram showing a fuel injection duration calculation routine executed in a conventional control apparatus.

In FIG. 15, the CPU 11*a* copies the correction term TAUB to a correction term TAU at step 1501. The CPU 11*a* executes the processing of steps 703 and 704, and calls the calculation routine at step 705 so that the addition routine shown in FIG. 10 is executed. Here, because the calculation of the correction terms designated in the information table 4 is also the addition processing, the addition routine shown in FIG. 10 is called as in the case of the information table 1. Thus, the processing program shown in FIG. 10 may be used commonly, thus reducing the storage capacity of the memory which stores the programs.

At step 1001 in FIG. 10, the addition is executed in the similar manner to add sequentially a wall-sticking fuel correction value FMW and an external adjustment correction value ADJ to the copied value TAU to determine the fuel injection duration TAU as the final control quantity. Thus, the CPU 11*a* returns to step 503, determines at step 305 that all the required calculations have been completed, and returns to step 305 to store the calculated final injection duration TAU.

In the event of applying the programs for one type of engine to another type of engine, the information tables 1 to 4 shown in FIGS. 8A to 8D are modified. For instance, if the calculation of the injection duration TAU requires another correction value α and the small air enrichment correction value FKL is not required, the information tables 1 to 4 may be only partly changed.

Specifically, as shown in FIGS. 16A to 16D, INDEX2 is added to the information table 4 (FIG. 16D) to register therein data indicative of the address in which the correction value α is stored, and the information regarding the correction value FKL of INDEX2 in the information table 1 is eliminated. That is, the changes are made only by the number of correction terms (the number of INDEX) in each information table. Thus, the programs for calculating the correction terms need not be changed at all, thereby enabling the programs to be applied to different types of engines and reducing remarkably the program development workload.

Further, even in the event that a change is required such that the external adjustment correction value ADJ is determined by a multiplication of correction terms β and γ, this change may be attained by only additionally providing the information tables regarding the correction terms β and γ and additionally providing a table between k=2 and k=3 in the designation information table shown in FIG. 6.

As described above, no changes are required to the actual calculation processing programs such as shown in FIGS. 7 and 10, no debugging of those calculation programs are needed thereby remarkably improving the program development work efficiency.

Although the present embodiment is described with reference to the processing of calculating the fuel injection duration TAU only, the similar processing may be implemented in the ignition control and the idle speed control as well. Further, the processing of FIG. 7 may be used commonly for both of the ignition timing calculation and the fuel injection duration calculation.

What is claimed is:

1. A control apparatus for vehicles comprising:

a plurality of correction information tables for storing a plurality of address data indicating types of correction calculations, and a plurality of correction terms to be calculated based on operating conditions in dependence on the types of correction calculations;

a designation information table for designating sequentially the plurality of correction information tables based on the types of correction calculations; and a processing unit for executing a fixed control program to sequentially refer to said designation information table to thereby sequentially designate and refer to said plurality of correction information tables for calculating sequentially a plurality of control values based on the address data and the correction terms, and calculating a final control value from the sequentially calculated control values.

2. A control apparatus as in claim 1, wherein the designation information table has:

areas for storing a table number of the plurality of correction information tables; and a plurality of areas for storing head addresses of the plurality of correction information tables.

3. A control apparatus as in claim 1, wherein results from calculating sequentially a plurality of control values is changed by modifying said correction information tables only.

4. A control apparatus as in claim 3, wherein said correction data tables are modified by eliminating and/or adding at least one of said correction terms.

5. A control apparatus for vehicles comprising:

a plurality of correction information tables for storing a plurality of address data indicating types of correction calculations, and a plurality of correction terms to be calculated based on operating conditions in dependence on the types of correction calculations;

a designation information table for designating sequentially the plurality of correction information tables based on the types of correction calculations; and a processing unit for calculating sequentially a plurality of control values based on the address data and the correction terms with reference to the correction information tables designated by the designation information table, and calculating a final control value from the sequentially calculated control values;

wherein each of the plurality of correction information tables has:

an area for storing a head address of an initialization routine;

an area for storing a head address of a calculation processing routine of each type of correction calculations;

an index area for storing the number of correction terms; and a plurality of correction term areas for storing address data of the type of correction calculation for each index.

6. A control apparatus as in claim 5, wherein the plurality of correction terms in the correction information table is capable of being changed by elimination and addition.

7. A control apparatus for vehicles comprising:

a plurality of sensors for sensing operating conditions of a control object;

a processing unit for calculating a control value for the control object based on the sensed operating conditions, the control value being a function of a plurality of correction terms; and a memory including a control program defining a calculation operation of the processing unit, and a plurality of tables to be referred to during an execution of the control program by the processing unit, wherein the control program is fixed independently of types of the control object and the tables are variable in dependence on the types of the control object;

the tables includes:

a plurality of correction information tables for storing a plurality of address data indicating types of correction calculations, and the plurality of correction terms to be calculated based on the operating conditions in dependence on the types of correction calculations; and a designation information table for designating sequentially the plurality of correction information tables based on the types of correction calculations, said control program sequentially referring to said designation information table to sequentially designate and refer to the plurality of correction information tables.

8. A control apparatus as in claim 7, wherein results from calculating a control value are changed by modifying said correction information tables only.

9. A control apparatus as in claim 8, wherein said correction information tables are modified by eliminating and/or adding at least one of said correction terms.

10. A control apparatus development method for vehicles comprising the steps of:

fixing, independently of a type of a control object, a control program for calculating a control value for the control object based on sensed operating conditions, the control value being a function of a plurality of correction terms; and changing, in response to a change in the type of the control object, a plurality of tables to be referred to during an execution of the control program by the processing unit, wherein the tables includes:

a plurality of correction information tables for storing a plurality of address data indicating types of correction calculations, and the plurality of correction terms to be calculated based on the operating conditions in dependence on the types of correction calculations; and a designation information table for designating sequentially the plurality of correction information tables based on the types of correction calculations, said control program sequentially referring to said designation information table to sequentially designate and refer to the plurality of correction information tables.

11. A control apparatus as in claim 10, wherein results from calculating a control value are changed by modifying said correction information tables only.

12. A control apparatus as in claim 11, wherein said correction information tables are modified by eliminating and/or adding at least one of said correction terms.

13. A method of controlling a control object by a processing unit which executes a control program stored in a memory, the method comprising steps of:

calculating, by executing a first part of the control program, a basic control value based on first predetermined operating conditions of the control object;

calculating, by executing a second part of the control program, a plurality of correction values based on second predetermined operating conditions of the control object;

calculating, by executing a third part of the control program, a final control value by correcting the calculated basic control value with the calculated plurality of correction values; and driving, by executing a fourth part of the control program, the control object by an amount corresponding to the calculated final control value;

wherein executing said second part of the control program includes steps of:

referring sequentially to a designation table stored in the memory which designates a plurality of correction data tables stored in the memory to designate the correction data tables one by one; and referring sequentially to the correction data tables in the order as designated by the designation table to determine the correction values one by one.

14. A control apparatus as in claim 13, wherein results from calculating a final control value can be changed by modifying said connection data tables only.

15. A control apparatus as in claim 14, wherein said correction data tables are modified by eliminating and/or adding at least one of said correction terms.

* * * * *